US012418045B2

(12) United States Patent
Yoshida

(10) Patent No.: US 12,418,045 B2
(45) Date of Patent: Sep. 16, 2025

(54) PHOSPHORUS SULFIDE COMPOSITION FOR SULFIDE-BASED INORGANIC SOLID ELECTROLYTE MATERIAL

(71) Applicant: FURUKAWA CO., LTD., Tokyo (JP)

(72) Inventor: Tatsushi Yoshida, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 649 days.

(21) Appl. No.: 17/765,987

(22) PCT Filed: Aug. 18, 2020

(86) PCT No.: PCT/JP2020/031132
§ 371 (c)(1),
(2) Date: Apr. 1, 2022

(87) PCT Pub. No.: WO2021/065228
PCT Pub. Date: Apr. 8, 2021

(65) Prior Publication Data
US 2022/0352545 A1  Nov. 3, 2022

(30) Foreign Application Priority Data
Oct. 2, 2019 (JP) .................. 2019-182305

(51) Int. Cl.
*H01M 10/0562* (2010.01)
*C01B 25/14* (2006.01)
(Continued)

(52) U.S. Cl.
CPC ......... *H01M 10/0562* (2013.01); *C01B 25/14* (2013.01); *C03C 3/321* (2013.01);
(Continued)

(58) Field of Classification Search
CPC .............. H01M 10/0562; H01M 4/62; H01M 10/0525; H01M 2300/0068; C01B 25/14;
(Continued)

(56) References Cited

U.S. PATENT DOCUMENTS 10,280,109 B2  5/2019  Nakata et al.
10,461,363 B2  10/2019  Kanno et al.
(Continued)

FOREIGN PATENT DOCUMENTS

EP  2759525 A1  7/2014
EP  3214054 A1  9/2017
(Continued)

OTHER PUBLICATIONS

The Extended European Search Report dated Nov. 10, 2022, issued in counterpart EP Application No. 20872728.9. (11 pages).
(Continued)

*Primary Examiner* — Maria Laios
*Assistant Examiner* — Lawrence La Raia, III
(74) *Attorney, Agent, or Firm* — WHDA, LLP

(57) ABSTRACT

Provided is a phosphorus sulfide composition for a sulfide-based inorganic solid electrolyte material, the phosphorus sulfide composition including $P_4S_{10}$ and $P_4S_9$, in which when a total content of $P_4S_{10}$, $P_4S_9$, $P_4S_7$, and $P_4S_3$ in the phosphorus sulfide composition is represented by 100 mass %, a content of $P_4S_{10}$ calculated from a solid $^{31}$P-NMR spectrum is 70 mass % or more and 99 mass % or less.

9 Claims, 1 Drawing Sheet

(51) Int. Cl.
*C03C 3/32* (2006.01)
*C03C 4/18* (2006.01)
*C03C 10/00* (2006.01)
*H01B 1/10* (2006.01)
*H01M 4/62* (2006.01)
*H01M 10/0525* (2010.01)

(52) U.S. Cl.
CPC ............... *C03C 4/18* (2013.01); *C03C 10/00* (2013.01); *H01B 1/10* (2013.01); *H01M 4/62* (2013.01); *H01M 10/0525* (2013.01); *C01P 2002/86* (2013.01); *H01M 2300/0068* (2013.01); *Y02E 60/10* (2013.01)

(58) Field of Classification Search
CPC ........... C03C 3/321; C03C 4/18; C03C 10/00; H01B 1/10; C01P 2002/86; Y02E 60/10
See application file for complete search history.

(56) References Cited

U.S. PATENT DOCUMENTS

| | | |
|---|---|---|
| 2017/0155168 A1 | 6/2017 | Kanno et al. |
| 2018/0016185 A1 | 1/2018 | Nakata et al. |
| 2018/0145311 A1 | 5/2018 | Tojigamori |
| 2019/0173127 A1* | 6/2019 | Jang .................. H01M 10/0562 |
| 2021/0075056 A1* | 3/2021 | Nakata .................. C01B 25/14 |

FOREIGN PATENT DOCUMENTS

| | | |
|---|---|---|
| EP | 3637442 A1 | 4/2020 |
| JP | 2016-27545 A | 2/2016 |
| JP | 2016-091717 A | 5/2016 |
| JP | 2018-049731 A | 3/2018 |
| JP | 2018-080095 A | 5/2018 |
| WO | 2016/067631 A1 | 5/2016 |
| WO | WO-2018225526 A1 * | 12/2018 ............. C01B 25/14 |

OTHER PUBLICATIONS

International Search Report dated Oct. 20, 2020, issued in counterpart International Application No. PCT/JP2020/031132 (2 pages).
Notice of Allowance dated Aug. 14, 2024, issued in counterpart KR Application No. 10-2022-7011208 with English translation. (5 pages).
Office Action dated Jan. 30, 2024, issued in counterpart JP application No. 2023-097583 with English translation. (6 pages).

* cited by examiner

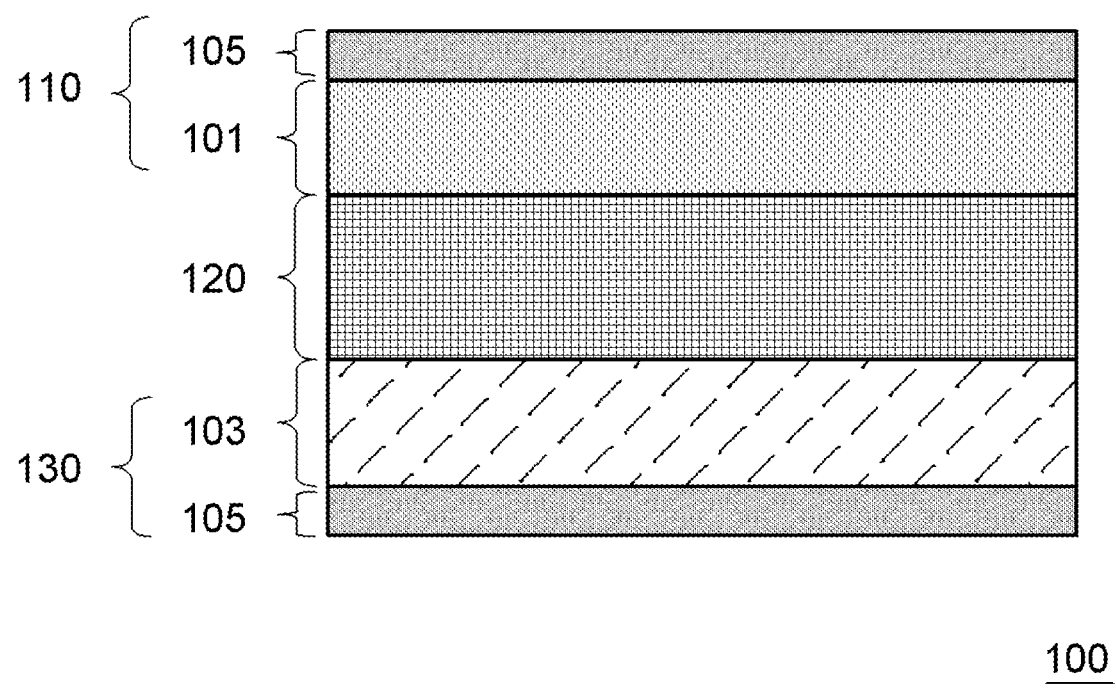

US 12,418,045 B2

PHOSPHORUS SULFIDE COMPOSITION FOR SULFIDE-BASED INORGANIC SOLID ELECTROLYTE MATERIAL

TECHNICAL FIELD

The present invention relates to a phosphorus sulfide composition for sulfide-based inorganic solid electrolyte material.

BACKGROUND ART

In general, a lithium ion battery is used as a power supply of a small mobile device such as a mobile phone or a laptop. In addition, recently, the lithium ion battery has been used not only as a power supply of a small mobile device but also as a power supply of an electric vehicle, an electric power storage, or the like.

In a currently commercially available lithium ion battery, an electrolytic solution including a combustible organic solvent is used. On the other hand, in a lithium ion battery in which a solid electrolyte is replaced with the electrolytic solution such that the entire battery is made of a solid (hereinafter, also referred to as "all-solid-state lithium ion battery"), which does not use combustible organic solvent in the battery, it is considered that a safety device can be simplified and manufacturing costs or productivity is excellent.

As a solid electrolyte material used for the solid electrolyte, for example, a sulfide-based inorganic solid electrolyte material is known.

Patent Document 2 (Japanese Unexamined Patent Publication No. 2016-27545) describes a sulfide-based solid electrolyte material having a peak at a position of $2\theta=29.86°\pm1.00°$ in X-ray diffraction measurement using a CuKα ray and a composition of $Li_{2y+3}PS_4$ ($0.1 \leq y \leq 0.175$).

Patent Document 2 (Pamphlet of International Publication No. WO2016/067631) describes a method of manufacturing sulfide glass formed of phosphorus sulfide as a raw material that satisfies the following Expression (1).

$$100 \times A/B \geq 37 \quad (1)$$

(in the expression, A represents peak areas of peaks that appear at peak positions in a range of 57.2 ppm or more and 53.3 ppm or less and 63.0 ppm or more and 64.5 ppm or less in $^{31}P$ NMR spectroscopy, and B represents the sum of peak areas of all of the peaks measured in $^{31}P$ NMR spectroscopy).

RELATED DOCUMENT

Patent Document

[Patent Document 1] Japanese Unexamined Patent Publication No. 2016-27545
[Patent Document 2] Pamphlet of international Publication No. WO7016/067631

SUMMARY OF THE INVENTION

Technical Problem

The sulfide-based inorganic solid electrolyte material has excellent electrochemical stability and lithium ionic conductivity, but the lithium ionic conductivity is lower than that of an electrolytic solution.

Therefore, for the sulfide-based inorganic solid electrolyte material used for a lithium ion battery, further improvement of lithium ionic conductivity is required while maintaining electrochemical stability.

The present invention has been made in consideration of the above-described circumstances, and provides a phosphorus sulfide composition with which the lithium ionic conductivity of the obtained sulfide-based inorganic solid electrolyte material can be improved.

Solution to Problem

The present inventors conducted a thorough investigation in order to provide a sulfide-based inorganic solid electrolyte material with improved lithium ionic conductivity. As a result, the present inventors found that the lithium ionic conductivity of the obtained sulfide-based inorganic solid electrolyte material can be improved by using a phosphorus sulfide composition in which the content of $P_4S_{10}$ calculated from a solid $^{31}P$-NMR spectrum is in a specific range as a raw material for manufacturing a sulfide-based inorganic solid electrolyte material, thereby completing the present invention.

That is, according to the present invention,
there is provided a phosphorus sulfide composition for a sulfide-based inorganic solid electrolyte material, the phosphorus sulfide composition including:
$P_4S_{10}$ and $P_4S_9$,
in which when a total content of $P_4S_{10}$, $P_4S_9$, $P_4S_7$, and $P_4S_3$ in the phosphorus sulfide composition is represented by 100 mass %,
a content of the $P_4S_{10}$ calculated from a solid $^{31}P$-NMR spectrum is 70 mass % or more and 99 mass % or less.

In addition, according to the present invention,
there is provided a raw material composition of a sulfide-based inorganic solid electrolyte material, the raw material composition including:
the above-described phosphorus sulfide composition; and
lithium sulfide.

Further, according to the present invention,
there is provided a method of manufacturing a sulfide-based inorganic solid electrolyte material, the method including a step of mechanically processing the above-described raw material composition of the sulfide-based inorganic solid electrolyte material.

Further, according to the present invention,
there is provided a sulfide-based inorganic solid electrolyte material that is obtained by using the above described phosphorus sulfide composition as a raw material.

Further, according to the present invention,
there is provided a solid electrolyte including the above-described sulfide-based inorganic solid electrolyte material.

Further, according to the present invention,
there is provided a solid electrolyte membrane including the above-described solid electrolyte as a main component.

Further, according to the present invention,
there is provided a lithium ion battery including:
a positive electrode including a positive electrode active material layer;
an electrolyte layer; and
a negative electrode including a negative electrode active material layer,
in which at least one of the positive electrode active material layer, the electrolyte layer, and the negative electrode active material layer includes the above-described sulfide-based inorganic solid electrolyte material.

Advantageous Effects of Invention

According to the present invention, it is possible to provide a phosphorus sulfide composition with which the lithium ionic conductivity of the obtained sulfide-based inorganic solid electrolyte material can be improved.

BRIEF DESCRIPTION OF THE DRAWINGS

FIG. 1 is a cross-sectional view of an example showing a structure of a lithium ion battery according to an embodiment of the present invention.

DESCRIPTION OF EMBODIMENTS

Hereinafter, an embodiment of the present invention will be described using the drawings. In ail the drawings, the same components are represented by common reference numerals, and the description thereof will not be repeated. In addition, the diagrams are schematic diagrams, in which a dimensional ratio does not match the actual one. Unless specified otherwise, a numerical range "A to B" represents A or more and B or less.

[Phosphorus Sulfide Composition]

First, a phosphorus sulfide composition according to the present embodiment will be described.

The phosphorus sulfide composition according to the present embodiment is a phosphorus sulfide composition for a sulfide-based inorganic solid electrolyte material (hereinafter, also referred to as "phosphorus sulfide composition"), the phosphorus sulfide composition including: $P_4S_{10}$ and $P_4S_9$, in which when a total content of $P_4S_{10}$, $P_4S_9$, $P_4S_7$, and $P_4S_3$ in the phosphorus sulfide composition is represented by 100 mass %, a content of $P_4S_{10}$ calculated from a solid $^{31}$P-NMR spectrum is 70 mass % or more and 59 mass % or less, preferably 72 mass % or more, more preferably 75 mass % or more, still more preferably 77 mass % or more, and still more preferably 80 mass % or more.

The upper limit of the content of $P_4S_{10}$ calculated from a solid $^{31}$P-NMR spectrum is not particularly limited and may be 98 mass % or less and 95 mass % or less.

In the phosphorus sulfide composition according to the present embodiment, by adjusting the content of $P_4S_{10}$ to be the above-described lower limit value or more, the lithium ionic conductivity of the obtained sulfide-based inorganic solid electrolyte material can be improved.

The reason for this is necessarily clear, but since the content of $P_4S_{10}$ in the phosphorus sulfide composition according to the present embodiment is relatively large, it is presumed that, the content of a phosphorus sulfide compound (for example, $P_4S_9$, $P_4S_7$, or $P_4S_3$) or a phosphorus sulfide polymer (insoluble sulfur) having a boiling point that is lower than or equal to that of $P_4S_{10}$ is low.

Due to the above-described reason, since in the phosphorus sulfide composition according to the present embodiment, the content of the phosphorus sulfide compound or the phosphorus sulfide polymer having a relatively low boiling point is low, it is presumed that, when the phosphorus sulfide composition according to the present embodiment is used, the lithium ionic conductivity of the obtained sulfide-based inorganic solid electrolyte material can be improved.

In the present embodiment, the phosphorus sulfide composition where the content of $P_4S_{10}$ is in the above-described range can be obtained by heating a raw material composition of phosphorus sulfide in a vacuum such that the content of the phosphorus sulfide compound (for example, $P_4S_9$, $P_4S_7$, or $P_4S_3$) or the phosphorus sulfide polymer having a boiling point lower than or equal to that of $P_4S_{10}$ in the phosphorus sulfide composition decreases.

In the phosphorus sulfide composition according to the present embodiment, it is preferable that a content of $P_4S_9$ calculated from a solid $^{31}$P-NMR spectrum is 1 mass % or more and 30 mass % or less. The upper limit of the content of $P_4S_9$ calculated from a solid $^{31}$P-NMR spectrum is preferably 28 mass % or less, more preferably 25 mass % or less, still more preferably 23 mass % or less, and still more preferably 20 mass % or less.

The lower limit of the content of $P_4S_9$ calculated from a solid $^{31}$P-NMR spectrum is not particularly limited and may be 2 mass % or more and 5 mass % or more.

The solid $^{31}$P-NMR spectrum can be measured, for example, using the following method.

First, in a glove box purged with $N_2$ gas, a measurement sample tube having a diameter of 3.2 mm is filled with a test sample and is spun (Magic Angle Spining: MAS) in a state where it is inclined at a magic angle (54.7 degrees) with respect to an external magnetic field to perform the measurement under the following conditions.

Device: A nuclear magnetic resonance (NMR) spectrometer, that is, JNM-ECA-600 manufactured by JEOL RESONANCE Inc. (trade name)
Observation frequency: 242.95 MHz
Pulse width: 90° pulse
Pulse waiting time: 2800 seconds
Number of integrations: 64 times
Measurement mode: single-pulse method
MAS rate: 12 kHz
Reference material: $(NH_4)_2HPO_4$·1.33 ppm Regarding peaks detected in the $^{31}$P-NMR spectrum of the test sample, waveform separation using a Gaussian function based on the following peak assignment is performed to calculate an integrated value of each of the peaks with reference to Reference Document 1 "Hellmut Eckert, Cheryl S. Liang and Galen D. Stucky: $^{31}$P magic angle spinning NMR of crystalline phosphorous sulfides. Correlation of $^{31}$P chemical shielding tensors with local environments, J. Phys. Chem, 1989, 93, 452-457". The integrated value of the peak derived from each of the component is proportional to the molar number of phosphorus included. Therefore, a content ratio can be calculated based on the obtained integrated value and the molecular weight of each of the components.

The chemical shift of $P_4S_{10}$ is 40 ppm to 52 ppm, the chemical shift of $P_4S_9$ is 52 ppm to 70 ppm, the chemical shift of $P_4S_7$ is 80 ppm to 90 ppm, 90 ppm to 100 ppm, or 110 ppm to 115 ppm, and the chemical shift of $P_4S_3$ is 80 ppm to 90 ppm or 90 ppm to 100 ppm.

In the phosphorus sulfide composition according to the present embodiment, is preferable that, when a solid $^{31}$P-NMR spectrum is measured, a peak is not observed in a range of 80 ppm or more, and 90 ppm or less. That is, it is preferable that peaks of $P_4S_7$ and $P_4S_3$ are not observed. As a result, the proportion of $P_4S_{10}$ in the phosphorus sulfide composition can be improved, and the lithium ionic conductivity of the obtained sulfide-based inorganic solid electrolyte material can be further improved.

The phosphorus sulfide composition according to the present embodiment includes $P_4S_{10}$ and $P_4S_9$. From the viewpoint that the lithium ionic conductivity of the obtained sulfide-based inorganic solid electrolyte material can be further improved, the total content of $P_4S_{10}$ and $P_4S_9$ in the phosphorus sulfide composition according to the present embodiment is preferably 95 mass % or more, more preferably 97 mass % or more, still more preferably 98 mass % or more, and still more preferably 99 mass % or more. The upper limit of the total content of $P_4S_{10}$ and $P_4S_9$ in the phosphorus sulfide composition ad cording to the present embodiment is not particularly limited and may be, for example, 100 mass % or less. Examples of a component in the phosphorus sulfide composition according to the present embodiment other than $P_4S_{10}$, and $P_4S_9$ include $P_4S_7$ and $P_4S_3$.

Examples of properties of the phosphorus sulfide composition according to the present embodiment include powdery. The sulfide-based inorganic solid electrolyte material described below is generally manufactured through a dry process. Therefore, when the properties of the phosphorus sulfide composition according to the present embodiment are powdery, the sulfide-based inorganic solid electrolyte material is more easily manufactured.

[Method of Manufacturing Phosphorus Sulfide Composition]

Next, a method of manufacturing the phosphorus sulfide composition according to the present embodiment will be described.

The method of manufacturing the phosphorus sulfide composition according to the present embodiment is different from a method of manufacturing a phosphorus sulfide composition in the related art. In other words, the phosphorus sulfide composition where the content of $P_4S_{10}$ is in the above-described range can only be obtained by adopting the improvement in terms of manufacturing, for example, through a process of heating a raw material composition of phosphorus sulfide in a vacuum such that the content of the phosphorus sulfide compound (for example, $P_4S_9$, $P_4S_7$, $P_4S_3$) or the phosphorus sulfide polymer (insoluble sulfur) having a boiling point lower than or equal to that of $P_4S_{10}$ in the phosphorus sulfide composition decreases.

However, the method of manufacturing the phosphorus sulfide composition according to the present embodiment can adopt various specific manufacturing conditions on the premise adopting the above-described improvement in terms of manufacturing.

Hereinafter, the method of manufacturing the phosphorus sulfide composition according to the present embodiment will be described in more detail.

The method of manufacturing the phosphorus sulfide composition according to the present embodiment includes, for example, steps (X) and (Y) described below.

Step (X): a step of preparing a raw material composition of phosphorus sulfide

Step (Y): a step of heating a raw material composition of phosphorus sulfide in a vacuum such that the content of the phosphorus sulfide compound (for example, $P_4S_9$, $P_4S_7$, or $P_4S_3$) or the phosphorus sulfide polymer (insoluble sulfur) having a boiling point lower than or equal to that of $P_4S_{10}$ in the phosphorus sulfide composition decreases.

First, the raw material composition of phosphorus sulfide is prepared.

The raw material composition of phosphorus sulfide used as the raw material is not particularly limited. A commercially available diphosphorus pentasulfide ($P_4S_{10}$) may be used as it is, or a raw material composition of diphosphorus pentasulfide obtained using a general well-known method of manufacturing phosphorus sulfide may be used.

Next, by heating a raw material composition of phosphorus sulfide in a vacuum, the content of the phosphorus sulfide compound (for example, $P_4S_9$, $P_4S_7$, or $P_4S_3$) or the phosphorus sulfide polymer having a boiling point lower than or equal to that of $P_4S_{10}$ in the phosphorus sulfide composition decreases. Here, the raw material composition of phosphorus sulfide is heated in a vacuum until the content of $P_4S_{10}$ is in the above-described range. As a result the phosphorus sulfide composition according to the present embodiment can be obtained. Here, for example, when the raw material composition of phosphorus sulfide is heated in a vacuum, a component accumulated in the bottom of the container without being evaporated is the phosphorus sulfide composition according to the present embodiment.

Conditions, for example, a pressure, a heating temperature, or a processing time during the heating of raw material composition of the phosphorus sulfide in a vacuum can be appropriately determined depending on the amount of the raw material composition of phosphorus sulfide processed.

The internal pressure of a vacuum heating device when the raw material composition of the phosphorus sulfide is heated in a vacuum is, for example, −0.01 MPa or lower and preferably −0.07 MPa or lower.

The heating temperature when the raw material composition of the phosphorus sulfide is heated in a vacuum is, for example, 220° C. or higher and 500° C. or lower and preferably 250° C. or higher and 350° C. or lower.

The time for which the raw material composition of the phosphorus sulfide is heated in a vacuum is, for example, 0.5 hours or longer and 24 hours or shorter and preferably 1 hour or longer and 5 hours or shorter.

[Sulfide-Based Inorganic Solid Electrolyte Material]

Hereinafter, the sulfide-based inorganic solid electrolyte material according to the present embodiment will be described.

The sulfide-based inorganic solid electrolyte material according to the present embodiment can be obtained by using the phosphorus sulfide composition according to the present embodiment as a raw material.

From the viewpoint of further improving the electrochemical stability and the stability and the handling properties, against moisture or in air, it is preferable that the sulfide-based inorganic solid electrolyte material according to the present embodiment includes Li, P, and S as constituent elements.

In addition, in the sulfide-based inorganic solid electrolyte material according to the present embodiment, from the viewpoint of further improving the lithium ionic conductivity, the electrochemical stability, and the stability and the handling properties against moisture or in air, a molar ratio Li/P of the content of Li to the content of P in the sulfide-based inorganic solid electrolyte material is preferably 1.0 or higher and 5.0 or lower, more preferably 2.0 or higher and 4.0 or lower, still more preferably 2.5 or higher and 3.8 or lower, still more preferably 2.8 or higher and 3.6 or lower, still more preferably 3.0 or higher and 3.5 or lower, still more preferably 3.1 or higher and 3.4 or lower, and still more preferably 3.1 or higher and 3.3 or lower, and a molar ratio S/P, of the content of S to the content of P is preferably 2.0 or higher and 5.0 or lower, more preferably 3.0 or higher and 5.0 or lower, still more preferably 3.5 or higher and 4.5 or lower, still more preferably 3.8 or higher and 4.2 or lower, still more preferably 3.9 or higher and 4.1 or lower, and still more preferably 4.0.

Here, the contents of Li, P, and S in the sulfide-based inorganic solid electrolyte material according to the present embodiment can be obtained by, for example, TCP Emission Spectroscopy or X-ray analysis.

In the sulfide-based inorganic solid electrolyte material according to the present embodiment, the lithium ionic conductivity measured using an alternating current impedance method under measurement conditions of 27.0° C., an applied voltage of 10 mV, and a measurement frequency range of 0.1 Hz to 7 MHz is preferably $0.5 \times 10^{-3}$ S·cm$^{-1}$ or higher, more preferably $0.6 \times 10^{-3}$ S·cm$^{-1}$ or higher, still more preferably $0.8 \times 10^{-3}$ S·cm$^{-1}$ or higher, and still more preferably $1.0 \times 10^{-3}$ S·cm$^{-1}$ or higher.

When the lithium ionic conductivity of the sulfide-based inorganic solid electrolyte material according to the present embodiment is the above-described lower limit value or higher, a lithium ion battery having further improved battery characteristics can be obtained further, by using the above-described sulfide-based inorganic solid electrolyte material, a lithium ion battery having further improved input and output characteristics can be obtained.

Examples of the shape of the sulfide-based inorganic solid electrolyte material according to the present embodiment include a particle shape.

The sulfide-based inorganic solid electrolyte material having a particle shape according to the present embodiment is not particularly limited, and an average particle size $d_{50}$ in a weight-based particle size distribution measured using a laser diffraction scattering particle size distribution method is preferably 1 µm or more and 1.00 µm or less, more preferably 3 µm or more and 80 µm or less, still more preferably 5 µm or more and 60 µm or less.

By adjusting the average particle size $d_{50}$ of the sulfide-based inorganic solid electrolyte material to be in the above-described range, the lithium ionic conductivity can be further improve while maintaining excellent handling properties.

It is preferable that the sulfide-based inorganic solid electrolyte material according to the present embodiment has excellent electrochemical stability. Here, the electrochemical stability refers to a property in which a material is not likely to be oxidized and reduced in a wide voltage range. More specifically, in the sulfide-based inorganic solid electrolyte material according to the present embodiment, a maximum value of an oxidative decomposition current measured under conditions of temperature of 25° C., a sweep voltage range of 0 to 5 V, and a voltage sweep rate of 5 mV/sec is preferably 0.50 µA or lower, more preferably 0.20 µA or lower, still more preferably 0.10 µA or lower, still more preferably 0.05 µA or lower, and still more preferably 0.03 µA or lower.

When the maximum value of the oxidative decomposition current in the sulfide-based inorganic solid electrolyte material is the above-described upper limit value or lower, the oxidative decomposition of the sulfide-based inorganic solid electrolyte material in the lithium ion battery can be suppressed, which is preferable.

The lower limit value of the maximum value of the oxidative decomposition current in the sulfide-based inorganic solid electrolyte material is not particularly limited and is, for example, 0.0001 µA or higher.

The sulfide-based inorganic solid electrolyte material according to the present embodiment can be used for any application where lithium ionic conductivity is required. In particular, it is preferable that the sulfide-based inorganic solid electrolyte material according to the present embodiment is used for a lithium ion battery. More specifically, the sulfide-based inorganic solid electrolyte material according to the present embodiment is used for a positive electrode active material layer, a negative electrode active material layer, an electrolyte layer, or the like in a lithium ion battery. Further, the sulfide-based inorganic solid electrolyte material according to the present embodiment is suitably used for a positive electrode active material layer, a negative electrode active material layer, a solid electrolyte layer, or the like forming an all-solid-state lithium ion battery, and is more suitably used for a solid electrolyte layer forming an all-solid-state lithium ion battery.

Examples of the all-solid-state lithium ion battery to which the sulfide-based inorganic solid electrolyte material according to the present embodiment is applied include an all-solid-state lithium ion battery in which a positive electrode, a solid electrolyte layer, and a negative electrode are stacked in this order.

[Method of Manufacturing Sulfide-Based Inorganic Solid Electrolyte Material]

Next, a method of manufacturing the sulfide-based inorganic solid electrolyte material according to the present embodiment will be described.

The method of manufacturing the sulfide-based inorganic solid electrolyte material according to the present embodiment includes, for example, a step of mechanically processing a raw material composition of the sulfide-based inorganic solid electrolyte material including phosphorus sulfide composition according to the present embodiment and lithium sulfide.

More specifically, the sulfide-based inorganic solid electrolyte material according to the present embodiment can be obtained using a manufacturing method including steps (A) and (B) described below. In addition, the method of manufacturing the sulfide-based inorganic solid electrolyte material according to the present embodiment optionally further includes steps (C) and (D) described below.

Step (A): a step of preparing a raw material composition of the sulfide-based inorganic solid electrolyte material including the phosphorus sulfide composition according to the present embodiment and lithium sulfide Step (B): a step of obtaining the sulfide-based inorganic solid electrolyte material in the vitreous state by mechanically processing the raw material composition of the sulfide-based inorganic solid electrolyte material such that the phosphorus sulfide composition and the lithium sulfide as raw materials are vitrified in a chemical reaction Step (C): a step of heating the obtained sulfide-based inorganic solid electrolyte material in the vitreous state such that at least a part thereof is crystallized.

Step (D): a step of crushing, classifying, or granulating the obtained sulfide-based inorganic solid electrolyte material (Step (A) of Preparing Raw Material Composition of Sulfide-Based Inorganic Solid Electrolyte Material)

First, a raw material composition of the sulfide-based inorganic solid electrolyte material including the phosphorus sulfide composition according to the present embodiment and lithium sulfide and optionally including lithium nitride is prepared. Here, a mixing ratio between the respective raw materials in the raw material composition is adjusted such that the obtained sulfide-based inorganic solid electrolyte material has a desired composition ratio.

A method of mixing the respective raw materials is not particularly limited as long as it is a mixing method capable of uniformly mixing the respective raw materials. For example, the raw materials can be mixed using a ball mill, a beads mill, a vibrating mill, an impact crushing device, a mixer (for example, a pug mixer, a ribbon mixer, a tumbler mixer, a drum mixer, or a V-type mixer), a kneader, a twin-screw kneader, an air flow grinder, a crusher, a rotary blade crusher, or the like.

Mixing conditions such as a stirring rate, a processing time, a temperature, a reaction pressure, or a gravitational acceleration applied to the mixture during the mixing of the respective raw materials can be appropriately determined based on the amount of the mixture processed.

The lithium sulfide used as a raw material is not particularly limited, and a commercially available lithium sulfide may be used. For example, lithium sulfide obtained by reaction of lithium hydroxide and hydrogen sulfide may also be used. From the viewpoint of obtaining the high-purity sulfide-based inorganic solid electrolyte material and suppressing a side reaction, it is preferable that lithium sulfide having little impurities is used.

Here, in the present embodiment, examples of the lithium sulfide includes lithium polysulfide.

Lithium nitride may be used as a raw material. Here, Nitrogen in the lithium nitride is discharged into the system as $N_2$. Therefore by using lithium nitride as an inorganic compound that is a raw material, only the Li composition can be increased with respect to the sulfide-based inorganic solid electrolyte material including Li, P, and S as constituent elements.

The lithium nitride according to the present embodiment is not particularly limited, and a commercially available lithium nitride (for example, $Li_3N$) may be used. For example, lithium nitride by reaction of metallic lithium (for example, Li foil) and nitrogen gas may be also be used. From the viewpoint of obtaining the high-purity solid electrolyte material and suppressing a side reaction, it is preferable that lithium nitride having little impurities is used.

(Step (B) of Obtaining Sulfide-Based Inorganic Solid Electrolyte Material in Vitreous State)

Next, the sulfide-based inorganic solid electrolyte material in the vitreous state is obtained by mechanically processing the raw material composition of the sulfide-based inorganic solid electrolyte material such that the phosphorus sulfide composition and the lithium sulfide as raw materials are vitrified in a chemical reaction Here, the mechanical process refers to a process of causing two or more kinds of inorganic compounds to mechanically collide with each other to be vitrified in a chemical reaction, for example, a mechanochemical process. Here, the mechanochemical process refers to a method of vitrifying a target composition while applying a mechanical energy such as a shear force or an impact force.

In addition, in the step (B) it is preferable that the mechanochemical process is a dry mechanochemical process from the viewpoint of realizing the process in an environment where water or oxygen is removed at a high level.

By using the mechanochemical process, the respective raw materials can be mixed while crushing the raw materials into fine particles. Therefore, the contact area of the respective raw materials can be increased. As a result, the reaction of the respective raw materials can be accelerated, so that the sulfide-based inorganic solid electrolyte material according to the present embodiment can be obtained with higher efficiency.

Here, the mechanochemical process refers to a method of Vitrifying a target composition while applying a mechanical energy such as a shear force, an impact force, or a centrifugal force, Examples of a device for vitrification (hereinafter, referred to as "vitrification device") in the mechanochemical process include: a crusher and disperser such as a ball mill, a beads mill, a vibrating mill, a turbo mill, a mechanofusion, a disc mill, or a roll mill; a rotation and impact crushing device including a mechanism as a combination of rotation (shearing stress) and impact (compressive stress) represented by a rock drill, a vibration drill, or an impact driver; a high-pressure grinding roll; and a vertical mill such as a roller vertical mill or a ball vertical mill. In particular, from the viewpoint of efficiently generating a very high impact energy, a ball mill or a beads mill is preferable, and a ball mill is more preferable. In addition, from the viewpoint of obtaining excellent continuous productivity, for example, a roll mill; a rotation and impact crushing device, including a mechanism as a combination of rotation (shearing stress) and impact (compressive stress) represented by a rook drill, a vibration drill, or an impact driver; a high-pressure grinding roll; or a vertical mill such as a roller vertical mill or a ball vertical mill is preferable.

Mixing conditions such as a rotation speed, a processing time, a temperature, a reaction pressure, or a gravitational acceleration applied to the raw material inorganic composition during the mechanical process of the raw material composition of the sulfide-based inorganic solid electrolyte material can be appropriately determined based on the kind of the raw material inorganic composition or the amount thereof processed. In general, as the rotation speed increases, the glass production rate increases, and as the processing time increases, the glass conversion rate increases.

Typically, when X-ray diffraction analysis is performed using CuKα rays as a radiation source, if a diffraction peak derived from the raw material is lost or decreases, it can be determined that the raw material composition of the sulfide-based inorganic solid electrolyte material is vitrified and a desired sulfide-based inorganic solid electrolyte material is obtained.

Here, in the step (B), it is preferable that the vitrification process is performed until the lithium ionic conductivity of the sulfide-based inorganic: solid electrolyte material measured using an alternating current impedance method under measurement conditions of 27.0° C., an applied voltage of 10 mV, and a measurement frequency range of 0.1 Hz to 7 MHz is preferably $1.0 \times 10^{-4}$ S·cm$^{-1}$ or higher, more preferably $2.0 \times 10^{-4}$ S·cm$^{-1}$ or higher, still more preferably $3 \times 10^{-4}$ S·cm$^{-1}$ or higher, and still more preferably $4.0 \times 10^{-4}$ S·cm$^{-1}$ or higher. As a result, a sulfide-based inorganic solid electrolyte material hair further improved lithium ionic conductivity can be obtained.

(Step (C) of Crystallizing at Least Part of Sulfide-Based Inorganic Solid Electrolyte Material)

Next, the sulfide-based inorganic solid electrolyte material in the glass ceramic state (also referred to as "crystallized glass") is formed by heating the obtained sulfide-based inorganic solid electrolyte material in the vitreous state such that at least a part of the sulfide-based inorganic solid electrolyte material is crystallized. As a result, a sulfide-based inorganic solid electrolyte material having further improved lithium ionic conductivity can be obtained.

That is, from the viewpoint of obtaining excellent lithium ionic conductivity, it is preferable that the sulfide-based inorganic solid electrolyte material according to the present embodiment is in the glass ceramic state (crystallized glass state).

The temperature at which the sulfide based inorganic solid electrolyte material in the vitreous state is heated is: preferably in a range of 220° C. or higher and 500° C. or lower and more preferably in a range of 250° C. or higher and 350° C. or lower.

The time for which the sulfide-based inorganic solid electrolyte material in the vitreous state is heated is not particularly limited as long as it is the time for which the desired sulfide-based inorganic solid electrolyte material in the glass ceramic state can be obtained. For example, the time is in a range of 0.5 hours or longer and 24 hours or shorter and preferably 1 hour or longer and 3 hours or shorter. A heating method is not particularly limited, and examples thereof include a method using a calcination furnace. Conditions such as a temperature or a time during heating can be appropriately adjusted in order to optimize properties of the sulfide-based inorganic solid electrolyte material according to the present embodiment.

In addition, it is preferable that the sulfide-based inorganic solid electrolyte material in the vitreous state is heated, for example, in an inert gas atmosphere. As a result, deterioration (for example, oxidation) of the sulfide-based in solid electrolyte material can be prevented.

Examples of the inert gas when the sulfide-based inorganic solid electrolyte material in the vitreous state is heated include argon gas, helium gas, and nitrogen gas. In order to prevent impurities from being mixed in a product, it is preferable that the purity of the inert gas is as high as possible. In addition, in order to avoid contact with water, the dew point is preferably −30° C. or lower, more preferably −70° C. or lower, and still more preferably −80° C. or lower. A method of introducing the inert gas into the mixed system is not particularly limited as long as it is a method capable of fillip the mixed system with the inert gas atmosphere. Examples of the introduction method include a method of purging inert gas and a method continuously introducing inert gas at a given flow rate.

(Step (D) of Crushing, Classifying, or Granulating)

In the method of manufacturing the sulfide-based inorganic solid electrolyte material according to the present embodiment, optionally, the step of crushing, classifying, or granulating the obtained sulfide-based inorganic solid electrolyte material may be further performed. For example, by crushing the sulfide-based inorganic solid electrolyte material into fine particles and adjusting the particle size thereof through a classification operation or a granulation operation, a sulfide-based inorganic solid electrolyte material having a desired particle size can be obtained. The above-described crushing method is not particularly limited, and a well-known crushing method such as a mixer, an air flow grinder, mortar, a tumbling mill, or a coffee mill can be used. In addition, the above-described classification method is not particularly limited, and a well-known method such as a sieve can be used.

From the viewpoint of avoiding contact with water in air, it is preferable that crushing or classification is performed in an inert gas atmosphere or a vacuum atmosphere.

In order to obtain the sulfide-based inorganic solid electrolyte material according to the present embodiment, it is important to appropriately adjust the respective steps. The method of manufacturing the sulfide-based inorganic solid electrolyte material according to the present embodiment is not limited to the above-described method. By appropriately adjusting various conditions, the sulfide-based inorganic solid electrolyte material according to the present embodiment can be obtained.

[Solid Electrolyte]

Next, a solid electrolyte according to the present embodiment will be described. The solid electrolyte according to the present embodiment includes the sulfide-based inorganic solid electrolyte material according to the present embodiment.

The solid electrolyte according to the present embodiment is not particularly limited, and components other than the sulfide-based inorganic solid electrolyte material according to the present embodiment may include various Solid electrolyte materials other than the sulfide-based inorganic solid electrolyte material according to the present embodiment within a range where the object of the present invention does not deteriorate.

The solid electrolyte according to the present embodiment may include various solid electrolyte materials other than the sulfide based inorganic solid electrolyte material according to the present embodiment described above. The solid electrolyte materials other than the sulfide-based inorganic solid electrolyte material according to the present embodiment are not particularly limited as long as they have ionic conductivity and insulating properties general, solid electrolyte materials that are used for a lithium ion battery can be used. Examples of the solid electrolyte materials include: an inorganic solid electrolyte material such as a sulfide-based inorganic solid electrolyte material other than the sulfide-based inorganic solid electrolyte material according to the present embodiment, an oxide-based inorganic solid electrolyte material, or other lithium-based inorganic solid electrolyte materials; and an organic solid electrolyte material such as a polymer electrolyte.

Examples of the sulfide-based inorganic solid electrolyte material other than the sulfide-based inorganic solid electrolyte material according to the present embodiment described above include a $Li_2S$—$P_4S_{10}$ material, a $Li_2S$—$SiS_2$ material, a $Li_2S$—$GeS_2$ material, a $Li_2S$—$Al_2S_3$ material, a $Li_2S$—$SiS_2$—$Li_3PO_4$ material, a $Li_2S$—$P_4S_{10}$—$GeS_2$ material, a $Li_2S$—$Li_2O$—$P_4S_{10}$—$SiS_2$ material, a $Li_2S$—$GeS_2$—$P_4S_{10}$—$SiS_2$ material, a $Li_2$—$SnS_2$—$P_4S_{10}$—$SiS_2$ material, a $Li_2S$—$P_4S_{10}$—$Li_3N$ material, a $Li_2S_{2+x}$—$P_4S_3$ material, and a $Li_2S$—$P_4S_{10}$—$P_4S_3$ material. Among these, one kind may be used singly, or two or more kinds may be used in combination.

Among these, the $Li_2S$—$P_4S_{10}$ material is preferable from the viewpoint that it has excellent lithium ionic conductivity and has stability to the extent that decomposition or the like does not occur in a wide voltage range. Here, for example, the $Li_2S$—$P_4S_{10}$ material refers to a solid electrolyte material obtained by a chemical reaction caused by mechanically processing an inorganic composition including at least $Li_2S$ (lithium sulfide) and $P_4S_{10}$.

Here, in the present embodiment, examples of the lithium sulfide includes lithium polysulfide.

Examples of the oxide-based inorganic solid electrolyte material include: a NASICON type such as $LiTi_2(PO_4)$ $LiZr_2(PO_4)_3$, or $LiGe_2(PO_4)_3$, a perovskite type such as $(La_{0.5+x}Li_{0.5-3x})TiO_3$; a $Li_2O$—$P_2O_5$ material; and a $Li_2O$—$P_2O_5$—$Li_3N$ material.

Examples of the other lithium-based inorganic solid electrolyte material include LIPON, $LiNbO_3$, $LiTaO_3$, $Li_3PO_4$, $LiPO_{4-x}N_x$ (x satisfies $0<x\leq1$), LiN, and LISICON.

Further, a glass ceramic obtained by precipitating crystal of the inorganic solid electrolyte materials can also be used as the inorganic solid electrolyte material.

As the organic solid electrolyte material, a polymer electrolyte such as a dry polymer electrolyte or a gel electrolyte can be used.

As the polymer electrolyte, in general, those that are used for a lithium ion battery can be used.

[Solid Electrolyte Membrane]

Next, a solid electrolyte membrane according to the present embodiment will be described.

The solid electrolyte membrane according to the embodiment includes a solid electrolyte including the sulfide-based inorganic solid electrolyte material according to the present embodiment described above as a main component.

The solid electrolyte membrane according to the present embodiment is used, for example, as a solid electrolyte layer forming an all-solid-state lithium ion battery.

Examples of the all-solid-state lithium ion battery to which the solid electrolyte membrane according to the present embodiment is applied include an all-solid-state lithium ion battery in which a positive electrode, a solid electrolyte layer, and a negative electrode are stacked in this order. In this case, the solid electrolyte layer is formed of the solid electrolyte membrane.

The average thickness of the solid electrolyte membrane according to the present embodiment is preferably 5 μm or more and 500 μm or less, more preferably 10 μm or more and 200 μm or less, and still more preferably 20 μm or more and 100 μm or less. When the average thickness of the solid electrolyte membrane is the lower limit value or more, the loss of the solid electrolyte or the cracking of the solid electrolyte membrane surface can be further suppressed. In addition, when the average thickness of the solid electrolyte membrane is the upper limit value or less, the impedance of the solid electrolyte membrane can be further decreased. As a result, the battery characteristics of the obtained all-solid-state lithium ion battery can be further improved.

It is preferable that the solid electrolyte membrane according to the present embodiment is a compact obtained by compression-molding the particle-shaped solid electrolyte including the sulfide-based inorganic solid electrolyte material according to the present embodiment described above. That is, it is preferable that the particle-shaped solid electrolyte is compression-molded to obtain a solid electrolyte membrane having a given strength due to the anchor effect between the solid electrolyte material particles.

By obtaining the compact, the solid electrolyte particles bind to each other, and the strength of the obtained solid electrolyte membrane can be further improved. As a result, the loss of the solid electrolyte or the cracking of the solid electrolyte membrane surface can be further suppressed.

The content of the sulfide-based inorganic solid electrolyte material according to the present embodiment in the solid electrolyte membrane according to the present embodiment is preferably 50 mass % or more, more preferably 60 mass % or more, still more preferably 70 mass % or more, still more preferably 30 mass % or more, still more preferably 90 mass % or more with respect to 100 mass % of the total mass of the solid electrolyte membrane. As a result, the contact between the solid electrolyte particles can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be further improved.

The upper limit of the content of the sulfide-based inorganic solid electrolyte material according to the present embodiment in the solid electrolyte membrane according to the present embodiment is not particularly limited and is, for example, 100 mass % or less.

The planar shape of the solid electrolyte membrane is not particularly limited and can be appropriately selected according to the shape of an electrode or a current collector. For example, the planar shape is rectangular.

In addition, the solid electrolyte membrane according to the present, embodiment may include a binder resin. The content of the binder resin is preferably lower than 0.5 mass %, more preferably 0.1 mass % or less, still more preferably 0.05 mass % or less, and still more preferably 0.01 mass % or less with respect to 100 mass % of the total mass of the solid electrolyte membrane. In addition, it is more preferable that the solid electrolyte membrane according to the present embodiment does not substantially include the binder resin, and it is most preferable that the solid electrolyte membrane according to the present embodiment does not include the binder As a result, the contact between the solid electrolyte particles can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be improved.

"Substantially not including the binder resin" represents that the binder resin may be included to the extent that the effect of the present embodiment does not deteriorate. In addition, when an adhesive resin layer is provided between the solid electrolyte layer and the positive electrode or the negative electrode, an adhesive resin derived from the adhesive resin layer present in the vicinity of an interface between the solid electrolyte layer and the adhesive resin layer is excluded from "the binder resin in the solid electrolyte membrane".

In order to bind the inorganic solid electrolyte material particles to each other, the binder resin refers to a binder that is generally used for a lithium ion battery. Examples of the binder resin include polyvinyl alcohol, polyacrylic acid, carboxymethyl cellulose, polytetrafluoroethylene, polyvinylidene fluoride, styrene-butadiene rubber, and polyimide.

The solid electrolyte membrane according to the present embodiment can be obtained, for example, by depositing the particle-shaped solid electrolyte on a cavity surface of a mold or a substrate face in a film shape and subsequently compress-molding the solid electrolyte deposited in a film shape.

A method of compress-molding the solid electrolyte is not particularly limited. For example, the particle shaped solid electrolyte is deposited on a cavity surface of a mold, pressing by a mold and a stamp can be used. When the particle shaped solid electrolyte deposited on a substrate surface, pressing, roll pressing, or flat pressing by a mold and a stamp can be used.

The pressure at which the solid electrolyte is compressed is, for example 10 MPa or high or 500 MPa or lower.

In addition, optionally, the inorganic solid electrolyte deposited in a film shape may be compressed and heated. When the solid electrolyte particles are fused and bound to each other by performing the heating a compressing bonding such that the strength of the obtained solid electrolyte membrane can be further improved. As a result, the loss of the solid electrolyte or the cracking of the solid electrolyte membrane surface can be further suppressed.

The temperature at which the solid electrolyte is heated is, for example, 40° C. or higher and 500° C. or lower.

[Lithium Ion Battery]

FIG. 1 is a cross-sectional view showing a structure of a lithium ion battery 100 according to an embodiment of the present invention.

The lithium ion battery 100 according to the present embodiment includes, for example: a positive electrode 110 including a positive electrode active material layer 101; an electrolyte layer 120; and a negative electrode 130 including a negative electrode active material layer 103. At least one of the positive electrode active material layer 101, the negative electrode active material layer 103, and the electrolyte layer 120 includes the sulfide-based inorganic solid electrolyte material according to the present embodiment. In addition, it is preferable that ail of the positive electrode active material layer 101, the negative electrode active material layer 103, and the electrolyte layer 120 include the sulfide-based inorganic solid electrolyte material according to the present embodiment. In the present embodiment, unless specified otherwise, a layer including a positive electrode active material will be referred to as "the positive electrode active material layer 101". Optionally, the positive electrode 110 may or may not further include a current collector 105 in addition to the positive electrode active material layer 101. In addition, in the present embodiment, unless specified otherwise, a layer including a negative electrode active material will be referred to as "the negative electrode active material layer 103". Optionally, the negative electrode 130 may or may not further include the current collector 105 in addition to the negative electrode active material layer 103.

The shape of the lithium ion battery 100 according to the present embodiment is not particularly limited and may be a cylindrical shape, a coin shape, a square shape, a film shape, or any other shape.

The lithium ion battery 100 according to the present embodiment is manufactured using a generally well-known method. For example, the lithium ion battery 100 is prepared by forming a laminate including the positive electrode 110, the electrolyte layer 120, and the negative electrode 130 in a cylindrical shape, a coin shape, a square shape, a film shape, or any other shape and optionally filling the laminate with a non-aqueous electrolytic solution.

(Positive Electrode)

The positive electrode 110 is not particularly limited, and a positive electrode that is, generally used for a lithium ion battery can be used. The positive electrode 110 is not particularly and can be manufactured using a generally well-known method. For example, the positive electrode 110 can bel obtained by forming the positive electrode active material layer 101 including the positive electrode active material on a surface of the current collector 105 such as aluminum foil.

The thickness or density of the positive electrode active material layer 101 is appropriately determined depending on the intended use of the battery and can be set based on generally well-known information.

The positive electrode active material layer 101 includes the positive electrode active material.

The positive electrode active material is not particularly limited, and a generally well-known material can be used. For example, a composite oxide such as a lithium cobalt oxide ($LiCoO_2$), a lithium nickel oxide ($LiNiO_2$), a lithium manganese oxide ($LiMn_2O_4$), a solid solution oxide ($Li_2MnO_3$—$LiMO_2$ (M=Co, Ni, or the like)), lithium-manganese-nickel oxide ($LiNi_{1/3}Mn_{1/3}CO_{1/3}O_2$), or an olivine-type lithium phosphate ($LiFePO_4$); a conductive polymer such as polyaniline or polypyrrole; a sulfide-based positive electrode active material such as $Li_2S$, CuS, a Li—Cu—S compound, $TiS_2$, FeS, $MoS_2$, a Li—Mo—S compound, a Li—Ti—S compound, a Li—V—S compound, or a Li—Fe—S compound; or a material including sulfur as an active material such as acetylene black impregnated with sulfur, porous carbon impregnated with sulfur, or mixed powder including sulfur and carbon can be used. Among these positive electrode active materials, one kind may be used singly, or two or more kinds may be used in combination.

Among these, from the viewpoints obtaining higher discharge capacity density and obtaining higher cycle characteristics, a sulfide-based positive electrode active material is preferable, and one kind or two or more kinds selected from a Li—Mo—S compound, a Li—Ti—S compound, and a Li—V—S compound are more preferable.

Here, the Li—Mo—S compound includes Li, Mo, and S as constituent elements and can be typically obtained by a chemical reaction caused by mechanically processing an inorganic composition including molybdenum sulfide and lithium sulfide as raw materials.

In addition, the Li—Ti—S compound includes Li, Ti, and S as constituent elements and can be typically obtained by a chemical reaction caused by mechanically processing an inorganic composition including titanium sulfide and lithium sulfide as raw materials.

The Li—V—S compound includes Li, V, and S as constituent elements and can be typically obtained by a chemical reaction caused by mechanically processing an inorganic composition including vanadium sulfide and lithium sulfide as raw materials.

The positive electrode active material layer 101 is not particularly limited and may include, as components other than the positive electrode active material, for example, one or more materials selected from a binder resin, a thickener, a conductive auxiliary agent, a solid electrolyte material, and the like. Hereinafter, the respective materials will be described.

The positive electrode active material layer 101 may include a binder resin having a function of binding the positive electrode active material particles to each other and binding the positive electrode active material and the current collector 105 to each other.

The binder resin according to the present embodiment is not particularly limited as long as it is a typical binder resin that can be used for a lithium ion battery. Examples of the binder resin include polyvinyl alcohol, polyacrylic acid, carboxymethyl cellulose, polytetrafluoroethylene, polyvinylidene fluoride, styrene-butadiene rubber, and polyimide. Among the binders, one kind may be used singly, or two or more kinds may be used in combination.

From the viewpoint of securing the fluidity of a slurry suitable for application, the positive electrode active material layer 101 may include a thickener. The thickener is not particularly limited as long as it is a typical thickener that can be used for a lithium ion battery. Examples of the thickener include a cellulose-based polymer Such as: carboxymethyl cellulose, methyl cellulose, or hydroxypropyl cellulose and an ammonium salt and an alkali metal salt thereof; and a water-soluble polymer such as polycarboxylic acid, polyethylene oxide, polyvinyl pyrrolidone, polyacrylate salt, or polyvinyl alcohol. Among the thickeners, one kind may be used singly, or two or more kinds may be used in combination.

From the viewpoint of improving the conductivity of the positive electrode 110 the positive electrode active material layer 101 may include a conductive auxiliary agent. The conductive auxiliary agent is not particularly limited as long as it is a typical conductive auxiliary agent that can be used for a lithium ion battery. Examples of the conductive auxiliary agent include a carbon black such as Acetylene black or Ketjen black and a carbon material such as a vapor-grown carbon fiber.

The positive electrode according to the present embodiment may include a solid electrolyte including the sulfide-based inorganic solid electrolyte material according to the present embodiment or may include a solid electrolyte including a solid electrolyte material other than the sulfide-based inorganic solid electrolyte material according to the present embodiment. The solid electrolyte material other than the sulfide-based inorganic solid electrolyte material according to the present embodiment are not particularly limited as long as they have ionic conductivity and insulating properties, but a solid electrolyte material that is generally used for a lithium ion battery can be used. Examples of the solid electrolyte material include: an inorganic solid electrolyte material such as a sulfide-based inorganic solid electrolyte material, an oxide-based inorganic solid electrolyte material, or other lithium-based inorganic solid electrolyte materials; and an organic solid electrolyte material such as a polymer electrolyte. More specifically, the inorganic solid electrolyte material described above regarding the description of the solid electrolyte according to the present embodiment can be used.

The mixing ratio between various materials in the positive electrode active material layer 101 is appropriately determined depending on the intended use of the battery and can be set based on generally well-known information.

(Negative Electrode)

The negative electrode 130 is not particularly limited, and a negative electrode that is generally used for a lithium ion battery can be used. The negative electrode 130 is not particularly limited and can be manufactured using a generally well-known method. For example, the negative electrode 130 can be obtained by forming the negative electrode active material layer 103 including the negative electrode active material on a surface of the current collector 105 such as copper.

The thickness or density of the negative electrode active material layer 103 is appropriately determined depending on the intended use of the battery and can be set based on generally well-known information.

The negative electrode active material layer 103 includes the negative electrode active material.

The negative electrode active material not particularly limited as long as it is a typical negative electrode active material that an be used for a negative electrode of a lithium ion battery. Examples of the negative electrode active material include: a carbon material such as natural graphite, artificial graphite, resinous coal, carbon fiber, activated charcoal, hard carbon, or soft carbon; a metal material main formed of lithium, a lithium alloy, a tin alloy, silicon, a silicon alloy, gallium, a gallium alloy, indium, an indium alloy aluminum, or an aluminum alloy; a conductive polymer such as polyacene, polyacetylene, or polypyrrole; and a lithium titanium composite oxide (for example, $Li_4Ti_5O_{12}$). Among these negative electrode active materials, one kind may be used singly, or two or more kinds may be used in combination.

The negative electrode active material layer 103 is not particularly limited and include, as components other than the negative electrode active material, for example, one or more materials selected from a binder resin, a thickener, a conductive auxiliary agent, a solid electrolyte material, and the like. These materials are not particularly limited, and examples thereof are the same as those of the materials used or the positive electrode 110.

The mixing ratio between various materials in the negative electrode active material layer 103 is appropriately determined depending on the intended use of the battery and can be set based on generally well-known information.

(Electrolyte Layer)

Next, the electrolyte layer 120 will be described. The electrolyte layer 120 is a layer formed between the positive electrode active material layer 101 and the negative electrode active material layer 103.

Examples of the electrolyte layer 120 include a separator impregnated with a non-aqueous electrolytic solution and a solid electrolyte layer including a solid electrolyte.

The separator according to the present embodiment is not particularly limited as long as it has a function of electrically insulating the positive electrode 110 and the negative electrode 130 to allow transmission of lithium ions. For example, a porous membrane can be used.

As the porous membrane, a microporous polymer film is suitably used, and examples of a material thereof include polyolefin, polyimide, polyvinylidene fluoride, and polyester. In particular, a porous polyolefin film is preferable, and specific examples thereof include a porous polyethylene film and a porous polypropylene film.

The non-aqueous electrolytic solution is obtained by dissolving an electrolyte in a solvent.

As the electrolyte, any well-known lithium salt can be used, and the electrolyte may be selected depending on the kind of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Si$, $CH_3SO_3Li$, $LiCF_3SO_3$, $LiC_4F_9SO_3$, $Li(CF_3SO_2)_2N$, and a lithium lower aliphatic carboxylate.

The solvent in which the electrolyte is dissolved is not particularly limited as long as it is typically used as a liquid in which the electrolyte is dissolved. Examples of the solvent include: a carbonate such as ethylene carbonate (EC), propylene carbonate (PC), butylene carbonate (BC), dimethyl carbonate (DMC), diethyl carbonate (DEC), methyl ethyl carbonate (MEC), or vinylene carbonate (VC); a lactone such as γ-butyrolactone or γ-valerolactone; an ether such as trimethoxy methane, 1,2-dimethoxyethane, diethyl ether, 2-ethoxy ethane, tetrahydrofuran or 2-methyl tetrahydrofuran; a sulfoxide such as dimethyl sulfoxide; an oxolane such as 1,3-dioxolane or 4-methyl-1,3-dioxolane; a nitrogen-containing solvent such as acetonitrile, nitromethane formamide, dimethylformamide; an organic acid ester such as methyl formate, methyl acetate, ethyl acetate, butyl acetate, methyl propionate, or ethyl propionate; a phosphate triester or a diglyme; a triglyme; a sulfolane such as sulfolane or methyl sulfolane; an oxazolidinone such as 3-methyl-2-oxazolidinone; and a sulfone such as 1,3-propanesultone, 1,4-butanesultone, naphthasultone. Among these, one kind may be used singly, or two or more kinds may be used in combination.

The solid electrolyte layer according to the present embodiment is a layer formed between the positive electrode active material layer 101 and the negative electrode active material layer 103, and is formed of a solid electrolyte including a solid electrolyte material. The solid electrolyte in the solid electrolyte layer is not particularly limited as long as it has lithium ionic conductivity. In the present embodiment, it is preferable that the solid electrolyte includes the sulfide-based inorganic solid electrolyte material according to the present embodiment.

The content of the solid electrolyte in the solid electrolyte layer according to the present embodiment is not particularly limited as long as it has a proportion where desired insulating properties can be obtained. For example, the content of the solid electrolyte is in a range of 10 vol % or more and 100 vol % or less and preferably in a range of 50 vol % or more and 100 vol % or less. In particular, in the present embodiment, it is preferable that the solid electrolyte layer is formed of only the solid electrolyte including the sulfide-based inorganic solid electrolyte material according to the present embodiment.

In addition, the solid electrolyte layer according to the present embodiment may include a binder resin. By including the binder resin, a flexible solid electrolyte layer can be obtained. Examples of the binder resin include a fluorine-containing binder such as polytetrafluoroethylene or polyvinylidene fluoride. The thickness of the solid electrolyte layer is, for example, in a range of 0.1 μm or more and 1000 μm or less and preferably is a range of 0.1 μm or more and 300 μm or less.

The embodiment of the present invention has been described above. However, the embodiment is merely an example of the present invention, and various configurations other than the above-described configurations can also be adopted.

In addition, the present invention is not limited to the above-described embodiments, and modifications, improvements, and the like within a range where the object of the present invention can be achieved are included in the present invention.

EXAMPLES

Hereinafter, the present invention will be described in more detail using Examples and Comparative Examples. However, the present invention is not limited to these Examples and Comparative Examples.

[1] Measurement Method

First, a measurement method in the following Examples and Comparative Examples will be described.

(1) Particle Size Distribution

The particle size distribution of a sulfide-based inorganic solid electrolyte material obtained in each of Examples and Comparative Examples was measured with a laser diffraction method using a laser diffraction scattering particle size distribution analyzer (manufactured by Malvern Panalytical Ltd., Mastersizer 3000). Based on the measurement result, a particle size corresponding to a 50% cumulative value ($d_{50}$, average particle size) in the weight cumulative distribution of the sulfide-based inorganic solid electrolyte material was obtained.

(2) Solid $^{31}$P-NMR Spectroscopy

The solid $^{31}$P-NMR spectroscopy was performed as follows on the phosphorus sulfide composition obtained in each of Examples and Comparative Examples.

First, in a glove box purged with $N_2$ gas, a measurement sample tube having a diameter of 3.2 mm was filled with a test sample and was spun (Magic Angle Spining: MAS) in a state where it is inclined at a magic angle (54.7 degrees) with respect to an external magnetic field to perform the measurement under the following conditions.

Device: A nuclear magnetic resonance (NMR) spectrometer, that is, JNM-ECA-600 manufactured by JEOL RESONANCE Inc. (trade name)
Observation frequency: 242.95 MHz
Pulse width: 90° pulse
Pulse waiting time: 2800 seconds
Number of integrations: 64 times
Measurement mode: single-pulse method
MAS rate: 12 kHz
Reference material: $(NH_4)_2HPO_4$·1.33 ppm Regarding peaks detected in the $^{31}$P-NMR spectrum of the test sample, waveform separation using a Gaussian function based on the following peak assignment was performed to calculate an integrated value of each of the peaks with reference to Reference Document 1 "Hellmut Eckert, Cheryl S. Liang and Galen D. Stucky: $^{31}$P magic angle spinning NMR of crystalline phosphorous sulfides. Correlation of $^{31}$P chemical shielding tensors with local environments, J. Phys. Chem, 1989, 93, 452-457". Therefore, a content ratio was calculated based on the obtained integrated value and the molecular weight of each of the components.

The chemical shift of $P_4S_{10}$ is 40 ppm to 52 ppm, the chemical shift of $P_4S_9$ is 52 ppm to 70 ppm, the chemical shift of $P_4S_7$ is 80 ppm to 90 ppm, 90 ppm to 100 ppm, or 110 ppm to 115 ppm, and the chemical shift of $P_4S_3$ is 80 ppm to 90 ppm or 90 ppm to 100 ppm.

(3) Measurement of Composition Ratio in Sulfide-Based Inorganic Solid Electrolyte Material.

Mass % of each of Li, P, and S in the sulfide-based inorganic solid electrolyte material obtained in each of Examples and Comparative Examples was obtained by ICPEmission Spectroscopy using an ICP emission spectrometer (SPS3000, manufactured by Seiko Instruments Inc.). Based on the obtained values, a molar ratio between the respective elements was calculated.

(4) Measurement of Lithium Ionic Conductivity

In each of the sulfide-based inorganic solid electrolyte materials obtained in each of Examples and Comparative Examples, the lithium ionic conductivity was measured using an alternating current impedance method.

For the measurement of the lithium ionic conductivity, potentiostat/galvanostat SP-300 (manufactured by Bio-Logic Sciences Instruments) was used. The size of the sample was diameter: 9.5 mm and thickness: 1.2 to 2.0 mm. Measurement conditions were applied voltage: 10 mV, measurement temperature: 27.0° C., and measurement frequency range: 0.1 Hz to 7 MHz, and electrode: Li foil.

Here, 150 mg of the powdery sulfide-based inorganic solid electrolyte material obtained in each of Examples and Comparative Examples was pressed using a press machine at 270 MPa for 10 minutes, and the plate-shaped sulfide-based inorganic solid electrolyte material having a diameter of 9.5 mm and a thickness of 1.2 to 2.0 mm was obtained and used as the sample for the measurement of the lithium ionic conductivity.

[2] Manufacturing of Solid Electrolyte Material

The sulfide-based inorganic solid electrolyte material was prepared according to the following procedure.

Regarding the raw materials, $Li_2S$ (manufactured by Furukawa Co., Ltd., purity: 59.9%) and $Li_3N$ (manufactured by Furukawa Co., Ltd.) were used, and the phosphorus sulfide composition obtained in each of Examples and Comparative Examples was used as phosphorus sulfide.

First, a rotary blade crusher and an alumina pot (inner volume: 400 mL) were disposed in the glove box. Next, injection and evacuation of high-purity dry argon gas ($H_2O$<1 ppm, $O_2$<1 ppm) obtained by a gas purification device were performed three times in the glove box.

Next, using the rotary blade crusher (rotation speed: 18000 rpm), 5 g in total of $Li_2S$ powder, the phosphorus sulfide composition, and $Li_3N$ powder ($Li_2S$:phosphorus sulfide composition:$Li_3N$=71.1:23.7:5.3 (mol %)) were mixed (an operation of mixing the powders for 10 seconds and leaving the powders to stand for 10 seconds was performed 10 times (cumulative mixing time: 100 seconds)) it the glove box. As a result, a raw material inorganic composition was prepared.

Next, the raw material inorganic composition and 500 g of ZrO$_2$ balls having a diameter of 10 mm were put into the alumina pot (inner volume: 400 mL) in the glove box, and the pot was sealed.

Next, the alumina pot was taken out from the glove box, the alumina pot was attached to a ball mill placed in an atmosphere of dry air introduced through a membrane air dryer, and a mechanochemical process was performed at 120 rpm for 500 hours such that the raw material inorganic composition was vitrified. Whenever the powders were mixed for 48 hours, the powder was scraped off from the inner wall of the pot in the glove box. After sealing the pot, milling was continued in a dry air atmosphere.

Next, the alumina pot was put into the glove box, and the obtained powder was transported from the alumina pot to a carbon crucible and was annealed in a heating furnace disposed in the glove box at 290° C. for 2 hours.

The obtained sulfide-based inorganic solid electrolyte material was evaluated in various ways. The obtained results are shown in Tables 1-1 and 1-2.

[3] Manufacturing of Phosphorus Sulfide Composition

Example 1

As a raw material composition 1 of phosphorus sulfide, diphosphorus pentasulfide (trade name: SUPERIOR GRADE Powder, manufactured by Liaoning Ruixing Chemical Group) was used.

Next, the raw material composition 1 of phosphorus sulfide was put into a quartz container and set to a vacuum heating device (manufactured by Furukawa Co., Ltd.). Next, the raw material composition 1 of phosphorus sulfide was heated in a vacuum under reduced pressure of −0.094 MPa at 300° C. for 2 hours. Next, the component accumulated in the bottom of the quartz container was collected to obtain a phosphorus sulfide composition 1. The obtained phosphorus sulfide composition 1 was evaluated in various ways. The obtained results are shown in Tables 1-1 and 1-2.

Example 2

As a raw material composition 2 of phosphorus sulfide, diphosphorus pentasulfide (trade name: Normal S, manufactured by Perimeter Solutions) was used as it is.

Next, the raw material composition 2 of phosphorus sulfide was put into a quartz container and set to a vacuum heating device (manufactured by Furukawa Co., Ltd.). Next, the raw material composition 2 of phosphorus sulfide was heated in a vacuum under reduced pressure of −0.094 MPa at 300° C. for 2 hours. Next, the component accumulated in the bottom of the quartz container was collected to obtain a phosphorus sulfide composition 2. The obtained phosphorus sulfide composition 2 was evaluated in various ways. The obtained results are shown in Tables 1-1 and 1-2.

Example 3

As a raw material composition 3 of phosphorus sulfide, diphosphorus pentasulfide (trade name: Special S, manufactured by Perimeter Solutions) was used as it is.

Next, the raw material composition 3 of phosphorus sulfide was put into a quartz container and set to a vacuum heating device (manufactured by Furukawa Co., Ltd.). Next, the raw material composition 3 of phosphorus sulfide was heated in a vacuum under reduced pressure of −0.094 MPa at 300° C. for 2 hours. Next, the component accumulated in the bottom of the quartz container was collected to obtain a phosphorus sulfide composition 3. The obtained phosphorus sulfide composition 3 was evaluated in various ways. The obtained results are shown in Tables 1-1 and 1-2.

Comparative Example 1

As a phosphorus sulfide composition 4, diphosphorus pentasulfide (trade name: SUPERIOR GRADE Powder, manufactured by Liaoning Ruixing Chemical Group) was used as it is. The phosphorus sulfide composition 4 was evaluated in various ways. The obtained results are shown in Tables 1-1 and 1-2.

Comparative Example 2

As a phosphorus sulfide composition 5, diphosphorus pentasulfide (trade name: Special S, manufactured by Perimeter Solutions) was used as it is. The phosphorus sulfide composition 5 was evaluated in various ways. The obtained results are shown in Tables 1-1 and 1-2.

Here, the raw material compositions of phosphorus sulfide manufactured by Liaoning Ruixing Chemical Group and the raw material composition of phosphorus sulfide manufactured by Perimeter Solutions used in Examples and Comparative Examples were available as high-purity grade products.

| | Properties of Phosphorus Sulfide Composition | | | | |
|---|---|---|---|---|---|
| | Content of $P_4S_{10}$ [mass %] | Content of $P_4S_9$ [mass %] | Content of $P_4S_7$ [mass %] | Content of $P_4S_3$ [mass %] | Peak at 80 to 90 ppm |
| Example 1 | 80 | 20 | 0 | 0 | None |
| Example 2 | 80 | 20 | 0 | 0 | None |
| Example 3 | 90 | 10 | 0 | 0 | None |
| Comparative Example 1 | 30 | 70 | 0 | 0 | None |
| Comparative Example 2 | 40 | 60 | 0 | 0 | None |

| | Properties of Sulfide-based Inorganic Solid Electrolyte Material | | | |
|---|---|---|---|---|
| | Composition Ratio | | | Lithium Ionic |
| | Li/P [—] | S/P [—] | $d_{50}$ [μm] | Conductivity [S · cm$^{-1}$] |
| Example 1 | 3.3 | 4.0 | 4.3 | $1.40 \times 10^{-3}$ |
| Example 2 | 3.3 | 4.0 | 4.5 | $1.40 \times 10^{-3}$ |
| Example 3 | 3.3 | 4.0 | 4.5 | $1.40 \times 10^{-3}$ |
| Comparative Example 1 | 3.3 | 4.0 | 4.8 | $0.27 \times 10^{-3}$ |
| Comparative Example 2 | 3.3 | 4.0 | 4.8 | $0.47 \times 10^{-3}$ |

In the sulfide-based inorganic solid electrolyte material obtained by using the phosphorus sulfide composition according to each of Examples as a raw material, the lithium ionic conductivity was higher than that of the sulfide-based inorganic solid electrolyte material obtained by using the phosphorus sulfide composition according to each of Comparative Examples as a raw material.

The present application claims priority based on Japanese Patent Application No. 2019-182305 filed on Oct. 2, 2019, the entire content of which is incorporated herein by reference.

REFERENCE SIGNS LIST

100: lithium ion battery
101: positive electrode active material layer
103: negative electrode active material layer
105: current collector
110: positive electrode
120 electrolyte layer
130: negative electrode

The invention claimed is:

1. A phosphorus sulfide composition for sulfide-based inorganic solid electrolyte material, the phosphorus sulfide composition comprising:
   $P_4S_{10}$ and $P_4S_9$, and
   optionally, $P_4S_7$ and/or $P_4S_3$;
   wherein when a total content of $P_4S_{10}$, $P_4S_9$, $P_4S_7$, and $P_4S_3$ in the phosphorus sulfide composition is represented by 100 mass %,
   a content of the $P_4S_{10}$ calculated from a solid $^{31}$P-NMR spectrum is 70 mass % or more and 99 mass % or less,
   when a solid $^{31}$P-NMR spectrum is measured, a peak is not observed in a range of 80 ppm or more and 90 ppm or less, and
   a content of the $P_4S_9$ calculated from a solid $^{31}$P-NMR spectrum is 1 mass % or more and 30 mass % or less.

2. The phosphorus sulfide composition according to claim 1,
   wherein a total content of $P_4S_{10}$ and $P_4S_9$ is 95 mass % or more.

3. A raw material composition of a sulfide-based inorganic solid electrolyte material, the raw material composition comprising:
   the phosphorus sulfide composition according to claim 1; and
   lithium sulfide.

4. A sulfide-based inorganic solid electrolyte material that is obtained by using the phosphorus sulfide composition according to claim 1 as a raw material.

5. A solid electrolyte comprising the sulfide-based inorganic solid electrolyte material according to claim 4.

6. A solid electrolyte membrane comprising the solid electrolyte according to claim 5 as a main component.

7. A lithium ion battery comprising:
   a positive electrode including a positive electrode active material layer;
   an electrolyte layer; and
   a negative electrode including a negative electrode active material layer,
   wherein at least one of the positive electrode active material layer, the electrolyte layer, and the negative electrode active material layer includes the sulfide-based inorganic solid electrolyte material according to claim 4.

8. A method of manufacturing a sulfide-based inorganic solid electrolyte material, the method comprising a step of mechanically processing the raw material composition of the sulfide-based inorganic solid electrolyte material according to claim 3.

9. The method of manufacturing a sulfide-based inorganic solid electrolyte material according to claim 8,
   wherein the method comprising a step of crystalizing at least a part of the sulfide-based inorganic solid electrolyte material by heating the obtained sulfide-based inorganic solid electrolyte material in a range of 220° C. or higher and 350° C. or lower.

* * * * *